US012459144B2

(12) United States Patent
Denkert et al.

(10) Patent No.: US 12,459,144 B2
(45) Date of Patent: Nov. 4, 2025

(54) HANDLE WITH AN EJECTOR FOR A WET RAZOR

(71) Applicant: Feintechnik GmbH Eisfeld, Eisfeld (DE)

(72) Inventors: Uwe Denkert, Neustadt bei Coburg (DE); Roland Knauer, Rödental (DE); Jonas Trier, Eisfeld (DE)

(73) Assignee: Feintechnik GmbH Eisfeld, Eisfeld (DE)

( * ) Notice: Subject to any disclaimer, the term of this patent is extended or adjusted under 35 U.S.C. 154(b) by 293 days.

(21) Appl. No.: 17/963,976

(22) Filed: Oct. 11, 2022

(65) Prior Publication Data

US 2023/0112793 A1 Apr. 13, 2023

(30) Foreign Application Priority Data

Oct. 13, 2021 (DE) ..................... 10 2021 126 490.1

(51) Int. Cl.
*B26B 21/52* (2006.01)
*B26B 21/40* (2006.01)
*B26B 21/22* (2006.01)

(52) U.S. Cl.
CPC ........ *B26B 21/521* (2013.01); *B26B 21/4062* (2013.01); *B26B 21/225* (2013.01)

(58) Field of Classification Search
CPC ... B26B 21/225; B26B 21/4062; B26B 21/52; B26B 21/521
USPC ................................................ 30/47–51, 526
See application file for complete search history.

(56) References Cited

U.S. PATENT DOCUMENTS 4,198,746 A * 4/1980 Trotta ................... B26B 21/225 30/47
4,253,237 A * 3/1981 Jacobson .............. B26B 21/521 30/530
4,266,340 A * 5/1981 Bowman ............... B26B 21/225 30/47

(Continued)

FOREIGN PATENT DOCUMENTS

DE 10 2004 061 446 A1 6/2006
DE 102021126490 B3 * 12/2022 ........... B26B 21/521

(Continued)

*Primary Examiner* — Jason Daniel Prone
(74) *Attorney, Agent, or Firm* — Florek & Endres PLLC

(57) ABSTRACT

The invention relates to a handle for a wet razor including a handle section as well as a coupling section for detachably attaching a cutting unit to the handle. The coupling section comprises a housing section including a housing cavity, which has an insertion opening at the end directed toward the cutting unit and an operating opening. The coupling section furthermore comprises a connector including fastening elements, which engage in the housing section, and including a peg, which protrudes beyond the plane of the insertion opening. The coupling section furthermore comprises an ejector, which is inserted into the housing cavity so as to be axially displaceable, including a spring element, which axially urges the ejector into the housing cavity, and a ram, which during axial displacement of the ejector in the direction toward the cutting unit extends beyond the plane of the insertion opening. Finally, the coupling section comprises an operating button, which passes through the operating opening and acts on the ejector so as to enable the axial displacement thereof.

10 Claims, 4 Drawing Sheets

(56) References Cited

U.S. PATENT DOCUMENTS 4,413,411 A * 11/1983 Trotta ................... B26B 21/521 30/526
4,446,619 A * 5/1984 Jacobson .............. B26B 21/521 30/526
4,488,357 A * 12/1984 Jacobson .............. B26B 21/521 30/57
4,756,082 A * 7/1988 Apprille, Jr. .......... B26B 21/225 30/57
4,797,998 A * 1/1989 Motta ................... B26B 21/225 30/530
4,926,553 A * 5/1990 Miskin .................. B26B 21/225 30/529
5,016,352 A * 5/1991 Metcalf ................. B26B 21/521 30/47
5,044,077 A * 9/1991 Ferraro ................. B26B 21/225 30/47
5,157,834 A * 10/1992 Chen ..................... B26B 21/521 30/47
5,182,858 A * 2/1993 Chen ..................... B26B 21/521 30/49
5,333,383 A * 8/1994 Ferraro ................. B26B 21/521 30/527
5,347,717 A * 9/1994 Ts'ai ..................... B26B 21/225 30/532
D355,049 S * 1/1995 Yasui ............................ D28/48
5,636,442 A * 6/1997 Wain ..................... B26B 21/225 206/359
5,784,790 A * 7/1998 Carson, III ........... B26B 21/521 30/527
5,787,586 A * 8/1998 Apprille, Jr. .......... B26B 21/225 30/47
5,953,824 A * 9/1999 Ferraro ................. B26B 21/225 30/527
5,956,851 A * 9/1999 Apprille, Jr. ........ B26B 21/4062 30/526
6,085,426 A * 7/2000 Metcalf ................. B26B 21/521 30/526
6,434,839 B1 * 8/2002 Lee ....................... B26B 21/225 30/527
6,990,740 B2 * 1/2006 Follo ..................... B26B 21/521 30/527
7,093,363 B1 * 8/2006 Kuo ...................... B26B 21/521 30/32
8,096,054 B2 * 1/2012 Denkert ................ B26B 21/225 30/527
8,683,701 B1 * 4/2014 Loftin ..................... B26B 21/38 30/526
8,793,880 B2 * 8/2014 Taub ..................... B26B 21/521 30/47
9,327,415 B1 * 5/2016 Hovsepian ............ B26B 21/521
9,522,472 B2 * 12/2016 Leicht ................... B26B 21/225
10,137,584 B2 * 11/2018 Lee ....................... B26B 21/225
11,052,558 B2 * 7/2021 Lee ....................... B26B 21/225
11,230,023 B2 * 1/2022 Petratou ................ B26B 21/521
11,273,565 B2 * 3/2022 Good .................... B26B 21/521
11,420,352 B2 * 8/2022 Kopelas .............. B26B 21/4062
11,420,353 B2 * 8/2022 Malliaros .............. B26B 21/521
11,679,523 B2 * 6/2023 Kopelas ................ B26B 21/225 30/51
11,787,074 B2 * 10/2023 Gratsias ................ B26B 21/225 30/526
11,931,911 B2 * 3/2024 Kopelas ................ B26B 21/225
12,083,693 B2 * 9/2024 Kopelas .................. B26B 21/22
12,115,690 B2 * 10/2024 Kopelas ................ B26B 21/521
12,226,922 B2 * 2/2025 McNally ............... B26B 21/225
12,251,847 B1 * 3/2025 Mueller ................ B26B 21/521
2003/0079348 A1 * 5/2003 Follo ..................... B26B 21/521 30/527
2004/0181953 A1 * 9/2004 Follo ..................... B26B 21/521 30/527
2010/0251555 A1 10/2010 Park et al.
2010/0263220 A1 * 10/2010 Bruno ................... B26B 21/225 30/531
2015/0328788 A1 11/2015 Ren et al.
2018/0326606 A1 11/2018 Liberatore
2020/0070376 A1 * 3/2020 Petratou ................ B26B 21/521
2023/0249370 A1 * 8/2023 Usuda ................... B26B 21/521
2023/0278246 A1 * 9/2023 Huang .................. B26B 21/521 30/34.05
2023/0294316 A1 * 9/2023 Kopelas ................ B26B 21/521 30/527
2024/0025063 A1 * 1/2024 Go ........................ B26B 21/521
2024/0066734 A1 * 2/2024 Kim ...................... B26B 21/521
2024/0083053 A1 * 3/2024 Kopelas ................ B26B 21/521
2024/0083055 A1 * 3/2024 Go ........................ B26B 21/521
2024/0131737 A1 * 4/2024 Mesika ................. B26B 21/521
2024/0198549 A1 * 6/2024 Kopelas ................ B26B 21/521

FOREIGN PATENT DOCUMENTS

EP 1053837 B1 3/2003
EP 20902156 B1 11/2017
EP 4166290 A1 * 4/2023 ........... B26B 21/521
ES 2984823 T3 * 10/2024 ........... B26B 21/521
GB 2078589 A 1/1982
KR 20-2014-0002069 U 4/2014
WO 89/010245 A1 11/1989
WO 2009/154921 A2 12/2009
WO 2020/053360 A1 3/2020

* cited by examiner

HANDLE WITH AN EJECTOR FOR A WET RAZOR

FIELD OF THE INVENTION

The invention relates to a handle for a wet razor including an elongated handle section as well as a coupling section connected thereto, for detachably attaching a cutting unit to the handle. The handle comprises an ejector, which upon operation by the user serves to detach the cutting unit from the handle.

BACKGROUND OF THE INVENTION

A razor including an exchangeable shaving cartridge is shown in EP 1 053 837 B1. The shaving cartridge comprises a housing including one or more blades, a lubricating strip, a cap, and an interconnect member including a rotatable support structure. The housing is rotatably mounted about an axis of rotation. The support structure and an adjoining base structure allow a fixed but removable attachment of the shaving cartridge to an extension of a handle. Essentially, a plug connection is established between the connecting structure and the extension of the handle, for which purpose the base structure has a recess having inner surfaces that engage the outer surfaces of the extension of the handle. The goal of this plug connection is to immovably fasten the shaving cartridge at the handle to as great an extent as possible, while making it easy for the user to replace the shaving cartridge.

WO 89/10245 A1 describes a razor including a handle and a resiliently mounted razor blade holder. A pivot joint allows a pivoting motion of the razor blade holder with respect to the handle, wherein the pivot axis extends substantially parallel to the edges of the blades arranged in the razor blade holder. Moreover, a resiliently elastic mounting is provided which, when an appropriate force is applied, allows pitching, torsional and translatory movements of the razor blade holder with respect to the handle, the razor blade holder returning to a neutral position when the force is no longer applied. The elastic mounting is permanently integrated into the handle and requires a corresponding assembly effort during the production of the razor.

WO 2009/154921 A2 shows a razor including a blade unit, which is connected to the handle via a connecting member. The blade unit can be pivoted about a first axis extending parallel to the cutting edges. In addition, the blade unit can be pivoted about a second axis, which extends perpendicularly to the cutting edges. The connecting member has a complicated design including numerous individual parts, resulting in a considerable assembly effort when producing the razor.

WO 2020/053360 A1 shows a handle for a razor assembly. The handle has a handle body including a distal end with a cavity opening therein, a pusher that is retained in the cavity and extends outwardly from there, and a retaining element arranged at the distal end of the handle body.

EP 2 902 156 B1 describes a razor including a handle, a cutting unit and a coupling portion for attaching the cutting unit to the handle. The cutting unit comprises a blade unit including one or more blades. The coupling portion is used to detachably attach the cutting unit to the handle. A rod of the handle is detachably inserted into a mounting of the cutting unit, wherein the rod can be rotated from an idle position in both directions in relation to the mounting.

A razor handle for use in a wet shaving system, including exchangeable blade cartridges, is known from GB 2 078 589 A. The system comprises a handle, a head portion, a cap, a molding including two pivoting arms, which have pivot mounts at the forward ends thereof, a plunger, two hairpin spring sections, and a push button, which can be operated to move the arms apart so as to release the blade cartridge.

DE 10 2004 061 446 A1 discloses a shaver for carrying a detachable blade unit with a handle, a head piece, and a coupling unit arranged at the head piece for attaching the blade unit. The coupling unit comprises two carrying arms that are pivotably mounted in the head piece and connected to one another in one piece by way of a spiral spring element. The coupling unit furthermore includes two bearing elements, which are arranged at the carrying arms and engage in pivot bearings of the blade unit. Finally, a support element is provided, which is arranged so as to be resiliently displaceable between the head piece and the blade unit, transversely to the axis of rotation. A release element allows the blade unit to be detached by the bearing elements being pivoted out of the pivot bearings.

KR 20 2014 0 002 069 U describes a razor including a handle and a detachable blade cartridge. A ram, spring elements, an operating button, and housing shells are arranged at the handle, which retain the cartridge and allow ejection.

US 2010/0251555 A1 discloses a shaver, which has a removable cartridge and a handle. The cartridge comprises a cartridge body, at least one blade mounted to the lower surface, a connector mounting part provided on the upper surface, and a connector that is mounted to the connector mounting part and has a holder mounting part. The handle comprises a handle body, a housing, a holder, a connector, and an operating device.

US 2015/0328788 A1 describes a handle for a shaver, the handle comprising a handle body and a cover body. The cover body and the handle body are mutually covered to form an inserting part for inserting an interconnection structure. The inserting part forms a decreasing slant structure along the inserting direction, which fits into the interconnection structure. Pressing the handle body causes the interconnection structure to be ejected so that the shaving head is detached along with the interconnection structure.

US 2020/0070376 A1 describes a razor handle, an exchangeable razor blade cartridge, and a method for detaching the exchangeable razor blade cartridge from the razor handle. The razor handle comprises an elongated body, a connector, and a release mechanism. The razor handle furthermore comprises a release trigger, which is offset from the connector in the longitudinal direction of the elongated body, and a transmission mechanism, which connects the release trigger to the release mechanism.

US 2018/0326606 A1 shows a double-sided razor cartridge including a first shaving surface and a second shaving surface, which is located opposite the first shaving surface and is parallel thereto. Multiple razor blades are provided at each of the first and second shaving surfaces. Furthermore, an engagement component is provided, which serves the engagement of the cartridge with a razor handle. The cartridge is fastened at the handle by a pivot arm connection, which encompasses the engagement component. The pivot arm connection forms an assembly that can be removed from the handle so as to change the cartridge relative to the handle between the first razor side and the second razor side. A pressure pin seated on a spring and a release pusher are accommodated in an interior space of a connecting block for changing the cartridge. The connecting block is fastened in a chamber by a first locking bar, which has a strip including a cam surface that engages a ramp in the vicinity of the chamber bottom, and the strip is then fastened in a sub-chamber beneath the ramp next to the chamber bottom.

All known handles for wet razors have the problem that a detachable, yet secure coupling of an exchangeable cutting unit results in a complicated design and/or makes such handles difficult to produce and assemble.

Proceeding from the prior art, it is an object of the present invention to provide an improved handle for a wet razor, which enables a detachable connection to exchangeable cutting units, while having a simple, easy-to-produce and quick-to-assemble design. The handle should preferably also make it possible to be capable of being equipped for various configurations with few modifications so as to thereby enable multiple uses on different wet razors.

This object is achieved by a handle of the present invention.

SUMMARY OF THE INVENTION

The handle according to the invention for a wet razor initially includes an elongated handle section, which the user holds with one hand or several fingers while shaving, and a coupling section, which is preferably integrally connected to this handle and to which a cutting unit can be detachably attached. The cutting unit is preferably attached so as to be rotatable relative to the handle. The cutting unit comprises a blade unit including one or preferably more blades, in particular including three, four or five blades. The blade unit is preferably pivotably mounted about a pivot axis that extends parallel to the longitudinal extension of the blades. The cutting unit is not covered by the present invention, so that a description of further details of the cutting unit is dispensed with.

The coupling section of the handle has a housing section including a housing cavity into which further elements can be inserted. The housing section has a longitudinal axis, which is preferably situated in a shared plane with the longitudinal axis of the handle section, but within this shared plane extends at an angle with respect to the longitudinal axis of the handle section. An insertion opening through which further elements can be inserted during assembly is provided at the end of the housing cavity which is directed toward the cutting unit. After completion of the assembly of the handle, the insertion opening is preferably closed. The housing cavity also has an operating opening on another housing section side, preferably on an upper side of the housing section which is easily accessible for the user. The region of the operating opening can preferably be easily reached by the user with the thumb of the hand holding the handle.

Furthermore, the coupling section has a connector including fastening elements, which engage in the housing section, and including a peg, which protrudes beyond the plane of the insertion opening. During the connection to the cutting unit, the peg is detachably inserted into a peg hole of the cutting unit which has a complementary shape. To replace the cutting unit, the used cutting unit must be detached from the peg. According to specific embodiments, a snap-fit and/or detent connection can be formed between the peg and the peg hole. In a simple case, however, this is only a clamping connection which, however, must be designed to be tight enough so as not to inadvertently lose the cutting unit from the peg. In modified embodiments, the peg can comprise detent or snap-fit elements, which allow a latching engagement in the peg hole.

The coupling section moreover comprises an ejector, which is inserted into the housing cavity so as to be axially displaceable, either entirely or at least in sections. The ejector includes a spring element, which axially urges the ejector into the housing cavity, and a ram, which during axial displacement of the ejector in the direction toward the cutting unit, extends beyond the plane of the insertion opening so as to run against the cutting unit and displace the same axially on the peg, away from the housing section, that is, to disconnect or loosen the connection between the peg and the peg hole to such an extent that the cutting unit can be effortlessly removed by the user.

Finally, the coupling section comprises an operating button, which passes through the operating opening and acts on the ejector so as to bring about the axial displacement thereof. When the user operates the operating button, the ejector is axially displaced, so that the ram of the ejector acts on the cutting unit, detaching the same from the peg or at least loosening it. The operating button and the ejector can be designed in one piece, wherein this must be taken into consideration in the configuration of the insertion opening.

A considerable advantage of the handle according to the invention is that the ejector is able to simultaneously fulfill the ejection function, with the aid of the ram, and a desired restoring function, with the aid of the spring element, and can nonetheless be configured in the form of a single integral injection-molded part. As a result, an ejector thus configured can be very easily inserted into the housing cavity so that the production of the handle overall is simplified.

The ejector is designed in one piece with the spring element thereof and the ram thereof, and is particularly preferably made of a single plastic material as an injection-molded part. The ejector preferably has axially extending sliding surfaces, which are adapted to the inside shape of the housing cavity so as to be mounted there for the axial displacement, without resulting in tilting or clamping.

It is particularly advantageous when the spring element of the ejector is formed by one, and preferably two axially extending spring legs. The ram of the ejector is preferably formed by one, and preferably two push rods extending parallel to one another, which extend in a plane parallel to the spring legs. The spring legs particularly preferably extend into a cavity of the peg. The peg cavity is preferably axially aligned with the housing cavity and open toward the same. The spring element engages, or the spring legs engage, on the inner wall of the peg cavity and/or of the housing cavity and urge the ejector back into the housing cavity after an axial displacement initiated by the user. The ejector thus automatically returns to the idle position thereof as soon as the user no longer exerts a force on the operating button.

According to a modified embodiment, at least one of two spring elements, and preferably both spring elements together, form the ram of the ejector. The ram and the spring element are thus configured integrally.

According to one embodiment, the operating button can be axially displaced in the operating opening in the direction toward the cutting unit so as to displace the ejector in the same direction. The user thus moves the operating button and, by way of the same, the ejector in the direction toward the cutting unit so as to eject or detach the cutting unit from the peg.

According to a modified embodiment, the operating button can be displaced in the operating opening perpendicularly to the longitudinal axis of the housing cavity so as to act on a wedge-shaped ramp of the ejector in order to axially displace the ejector in the direction toward the cutting unit, parallel to the longitudinal axis of the housing cavity. The user thus moves the operating button perpendicularly to the longitudinal axis of the handle so as to eject or detach the cutting unit from the peg.

It is advantageous when the connector has a stop surface, which is substantially perpendicular to the longitudinal axis of the housing cavity and closes the insertion opening, wherein the stop surface has at least one passage opening for the ram. The stop surface preferably extends around the peg in a ring-shaped or collar-shaped manner. During assembly, the stop surface can, for example, be latchingly engaged, bonded, welded or clamped in the insertion opening after the ejector has previously been inserted through the insertion opening into the housing cavity.

In a preferred embodiment, at least two clamping fingers, which extend parallel to one another, and/or at least one flexible tongue including a catch lug are arranged on the side of the stop surface which faces away from the peg. The clamping fingers and/or the flexible tongue including the catch lug form the fastening elements of the connector which extend into the housing section.

BRIEF DESCRIPTION OF THE DRAWINGS

Further advantages, details and modifications will be apparent from the following description of preferred embodiments with reference to the drawings. In the drawings, which are not intended to limit the invention in any manner whatsoever.

DETAILED DESCRIPTION OF THE PREFERRED EMBODIMENT

Figure 1:
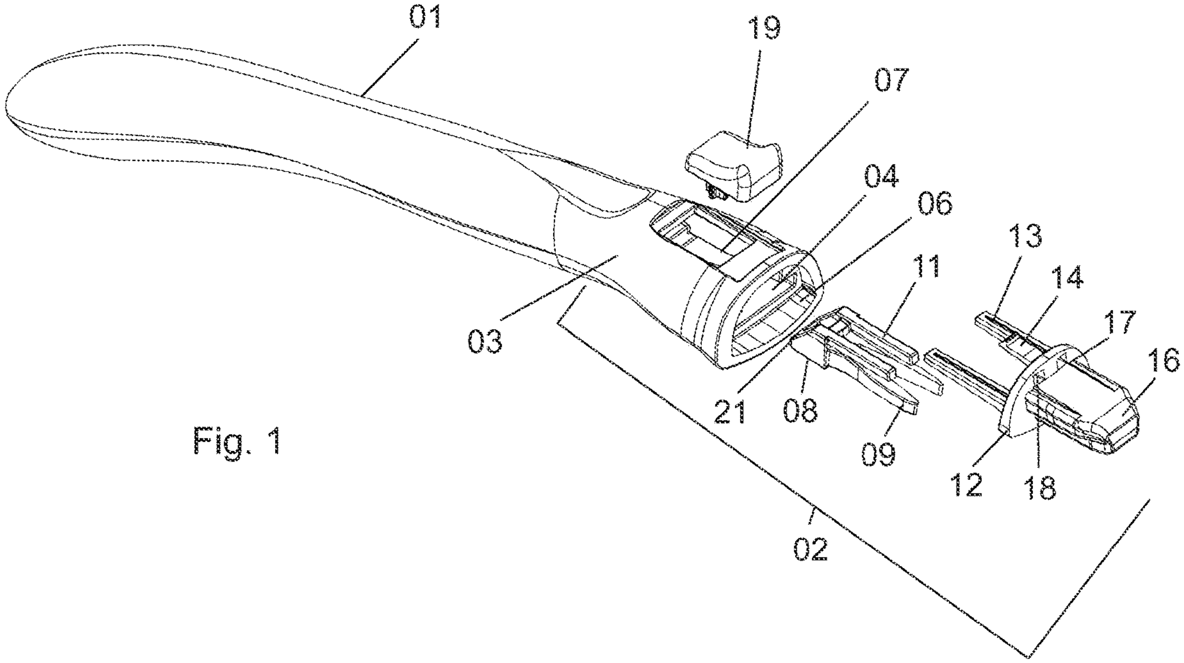
FIG. 1 is an exploded view of a first embodiment of a handle according to the invention.

FIG. 1 shows a first embodiment of a handle according to the invention for a wet razor in an exploded view. The handle comprises a rear handle section 01, which is held by the user with the fingers while shaving, and a front coupling section 02, which extends between the handle section and a cutting unit to be carried (not shown). The coupling section 02 comprises a housing section 03, which in the shown embodiment adjoins the handle section 01 in one piece and includes a housing cavity 04. The housing cavity 04 has an insertion opening 06 that is directed toward the cutting unit, and an operating opening 07 situated on the upper side of the housing section 03.

During assembly, an ejector 08 is inserted into the housing cavity 04 via the insertion opening 06. In this embodiment, the ejector 08 includes two spring legs 09, which act as a spring element and, after insertion into the housing cavity, also protrude beyond the housing section in an idle position (see FIG. 3). The ejector furthermore comprises two rams 11, which extend axially parallel to the spring legs 09, but in the idle position do not protrude beyond the housing section.

After the ejector 08 has been inserted, a connector 12 is installed, which engages in corresponding grooves in the housing cavity 04 with two clamping fingers 13. In addition, the connector 12 has a flexible tongue including a catch lug 14, which latchingly engages on a detent edge in the housing cavity as soon as the connector has been inserted completely. The connector includes a forwardly directed peg 16, onto which the cutting unit is placed (not shown). A stop surface 17, which closes the insertion opening 06 and can, for example, be bonded or welded in place there, is located between the peg 16 and the clamping fingers 13. Two passage openings 18 are provided in the stop surface 17, through which the rams 11 pass as soon as the ejector is displaced from the axially rear idle position into the axially front ejection position.

Finally, the coupling section 02 comprises an operating button 19, which at the upper side thereof has a depression-shaped operating surface, which is operated by the user when the cutting unit is to be detached or loosened from the peg. The operating button 19 sits in the operating opening 07 and, through the same, engages on a ramp 21 of the ejector 08 so as to bring about the axial displacement thereof. In the embodiment shown in FIGS. 1 to 5, the operating button 19 is axially displaced forward, in the direction toward the cutting unit, for this purpose by the user. As a result, the rams 11 protrude beyond the stop surface 17, where they engage on the cutting unit.

Figure 2:
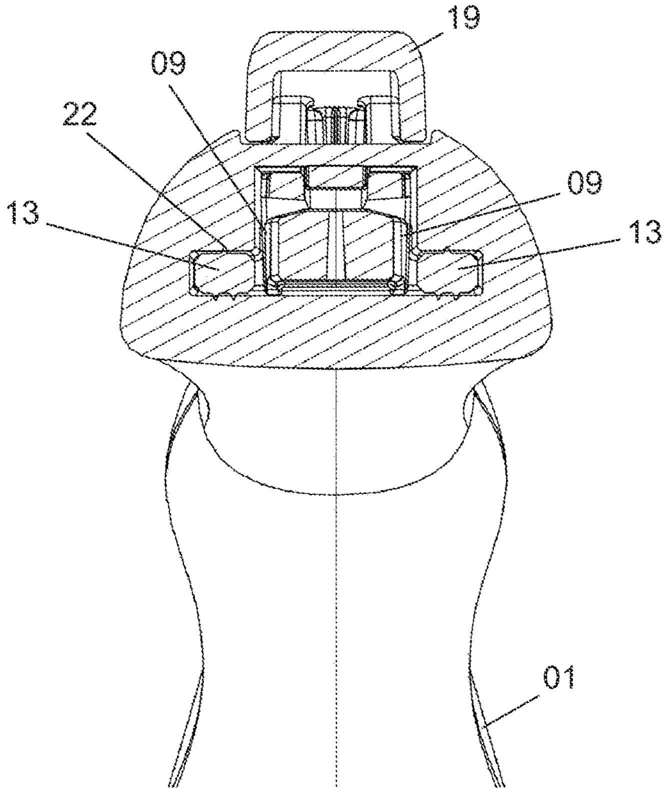
FIG. 2 is a cross-sectional view of the first embodiment of the handle in the assembled state.

FIG. 2 shows a cross-sectional view of the embodiment according to FIG. 1 when assembled. The selected cut surface extends parallel to the plane of the insertion opening 06 and also intersects the operating button 19, which has been inserted into the operating opening 07. It is apparent that the clamping fingers 13 of the connector 12 engage in grooves within the housing cavity 04, where they are fixed by clamping edges 22. Likewise, the two spring legs 09 are apparent, which rest partially against the wall of the housing cavity 04 with the outwardly directed surfaces thereof.

Figure 3:
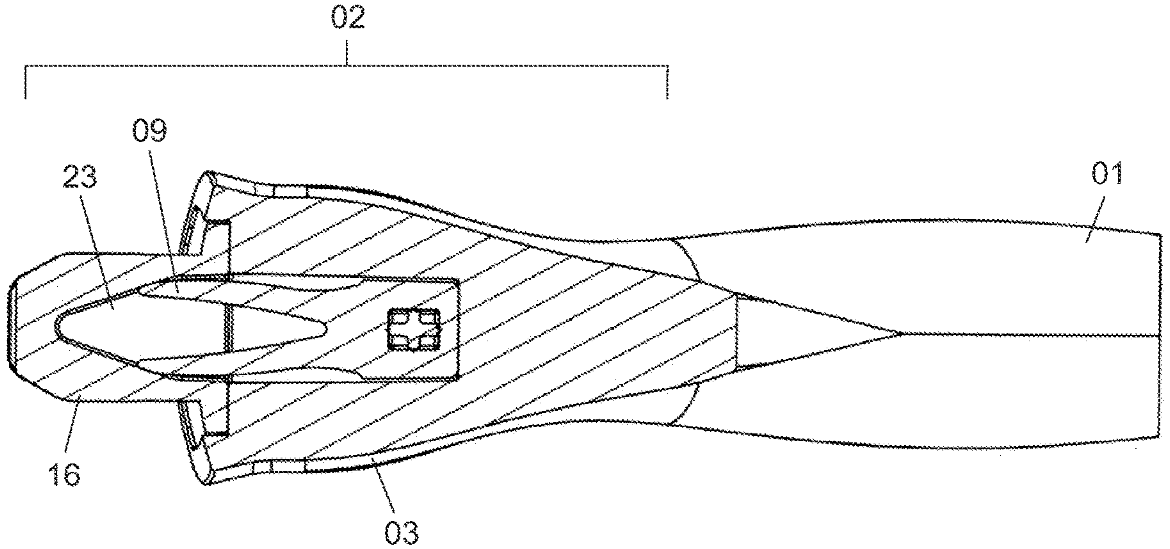
FIG. 3 is a partially cut view from beneath of a housing section of the first embodiment.

FIG. 3 shows the housing section 03 in a partially cut view from beneath in the idle position. It is apparent here that a peg cavity 23 is formed within the peg 16, in which the spring legs 09 of the ejector 08 engage. In the idle position shown, the ejector is not displaced forward, so that the spring legs are not or only slightly preloaded. When the user pushes the ejector axially forward, the spring legs 09 move further into the peg cavity 23 and, due to the opening cross-section tapering there, are pushed toward one another, whereby a spring force is built. When the user releases the operating button 19, this spring force causes the ejector to be pushed back into the idle position. It is apparent that the spring element of the ejector can also be configured differently.

Figure 4:
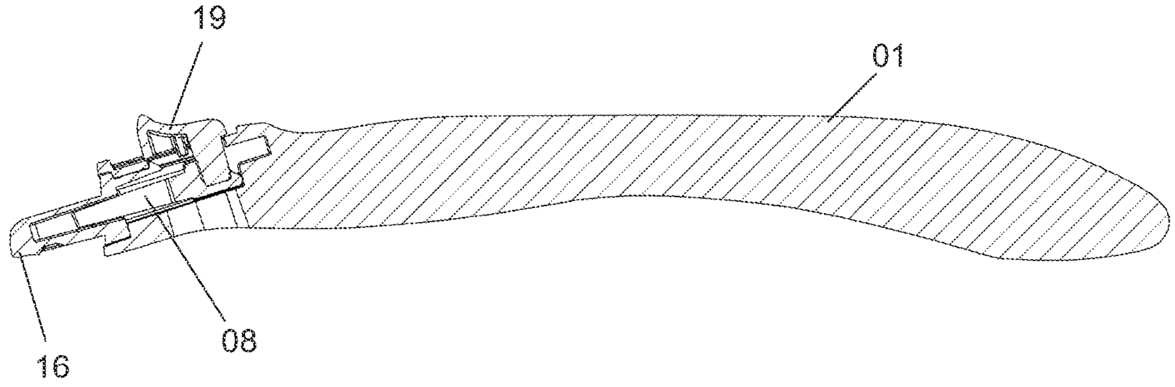
FIG. 4 is a longitudinal sectional view of the first embodiment in an idle position.

FIG. 4 shows a longitudinal sectional view of the embodiment according to FIG. 1 in the idle position. The operating button 19 is in the rear position thereof, that is, lying furthest from the cutting unit. As a result, the ejector 08 is also in the rear position, and the rams 11 do not emerge from the stop surface 17.

Figure 5:
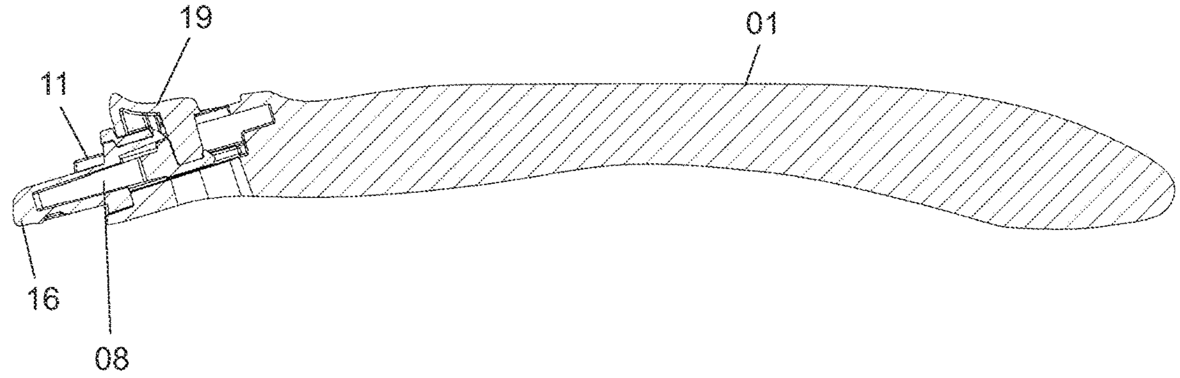
FIG. 5 is a longitudinal sectional view of the first embodiment in an ejection position.

FIG. 5 shows a longitudinal sectional view of the embodiment according to FIG. 1 in the ejection position. The operating button 19 is in the front position thereof, that is, situated closer to the cutting unit compared to the idle position. As a result, the ejector 08 is in the front position, and the rams 11 emerge from the stop surface 17.

Figure 6:
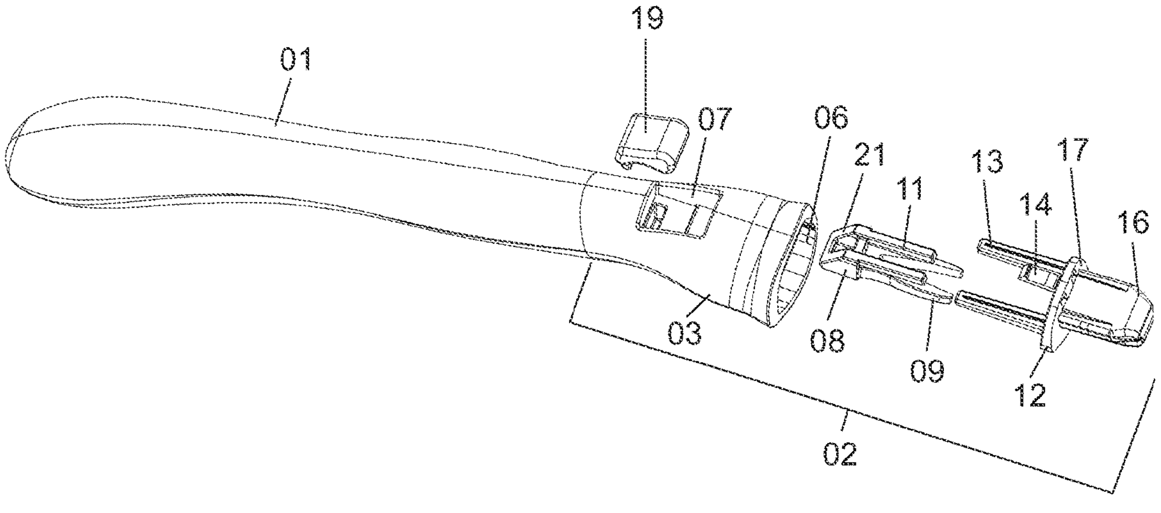
FIG. 6 is an exploded view of a second embodiment of the handle according to the invention.

FIG. 6 shows an exploded view of a second embodiment of the handle. The key difference compared to the aforementioned embodiment is that the operating button 19 cannot be axially displaced, but is moved vertically with respect to the longitudinal axis of the housing section 03 from an upper idle position into a lower ejection position, here by way of pivoting, for example. In the process, the operating button acts on the ramp 21, which has a wedge-shaped design, so that the ejector 08 is axially pushed forward when the operating button 19 is moved into the housing section 03 vertically with respect to the longitudinal axis.

Figure 7:
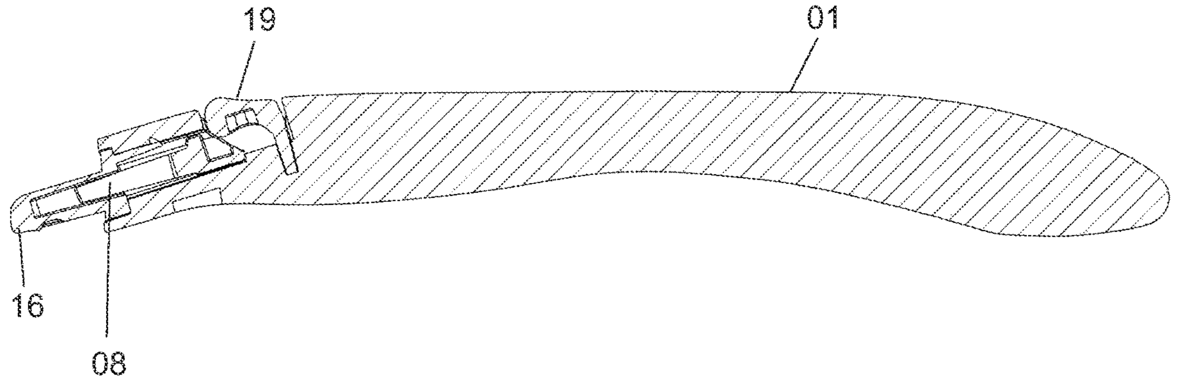
FIG. 7 is a longitudinal sectional view of the second embodiment in an idle position.

FIG. 7 shows a longitudinal sectional view of the embodiment according to FIG. 6 in the idle position. The operating button 19 is in the upper position thereof. As a result, the ejector 08 is in the rear position, and the rams 11 do not emerge from the stop surface 17.

Figure 8:
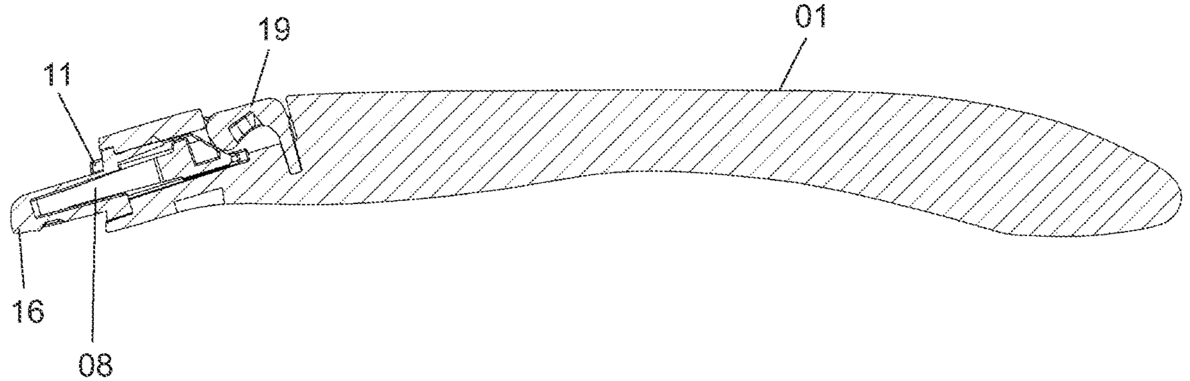
FIG. 8 is a longitudinal sectional view of the second embodiment in an ejection position.

FIG. 8 shows a longitudinal sectional view of the embodiment according to FIG. 6 in the ejection position. The operating button 19 is in the lower, pivoted position thereof, that is, situated deeper in the housing cavity 04 than in the idle position. As a result, the ejector 08 is in the front position, and the rams 11 emerge from the stop surface 17.

The invention claimed is:

1. A handle for a wet razor including an elongated handle section and a coupling section, for detachably attaching a cutting unit to the coupling section of the handle, the coupling section comprising:

a housing section comprising a housing cavity, said housing section having a longitudinal axis, an insertion opening at a first end, and an operating opening on a side of the housing section;

a connector comprising fastening elements, which engage the housing section, and a peg, which protrudes beyond a plane of the insertion opening and can be inserted into a peg hole of the cutting unit having a complementary shape;

an ejector, which is inserted into the housing cavity so as to be axially displaceable at least in part from a retracted position in a direction into the housing cavity to an extended position in a direction out of the housing cavity, said ejector comprising a spring element, which axially urges the ejector into the retracted position, and a ram, which during axial displacement of the ejector into the extended position, extends beyond the plane of the insertion opening so as to push against the cutting unit and displace the cutting unit axially on the peg away from the housing section, the spring element and the ram being one piece; and an operating button, which passes through the operating opening and acts on the ejector so as to enable the axial displacement thereof.

2. The handle according to claim 1, wherein the peg of the connector has a peg cavity, which is axially aligned with the housing cavity and is open toward the housing cavity, the spring element of the ejector extending into the peg cavity and engaging an inner wall of the peg cavity so as to axially urge the ejector into the housing cavity.

3. The handle according to claim 1, characterized in that the operating button can be axially displaced in the operating opening in the direction toward the cutting unit to displace the ejector in the same direction.

4. The handle according to claim 1, wherein the operating button can be displaced in the operating opening at an angle with respect to the longitudinal axis of the housing cavity so as to act on a wedge-shaped ramp of the ejector to axially displace the ejector in the direction toward the cutting unit, parallel to the longitudinal axis of the housing cavity.

5. The handle according to claim 1, wherein the operating button has an operating surface.

6. The handle according to claim 1, wherein planes in which the operating opening and the insertion opening extend are substantially perpendicular to one another.

7. The handle according to claim 1, wherein the connector further comprises a stop surface, which is substantially perpendicular to the longitudinal axis of the housing cavity and closes the insertion opening, the stop surface having at least one passage opening for the ram.

8. The handle according to claim 7, wherein the fastening elements of the connector comprise at least two clamping fingers, which extend parallel to one another, and at least one flexible tongue including a catch lug arranged on a side of the stop surface opposite the peg and extending into the housing cavity.

9. The handle according to claim 1, wherein the spring element is formed by at least one axially extending spring leg, and the ram is formed by at least one push rod which extends parallel to the spring leg.

10. The handle according to claim 9, wherein the at least one axially extending spring leg is two axially extending spring legs and the at least one push rod is two push rods.

* * * * *